(12) United States Patent
Oh

(10) Patent No.: US 11,342,733 B2
(45) Date of Patent: May 24, 2022

(54) BRACKET SYSTEM FOR MOUNTING ELECTRICAL BOXES

(71) Applicant: ERICO International Corporation, Solon, OH (US)

(72) Inventor: Michael Hung-Sun Oh, Twinsburg, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 17/194,687

(22) Filed: Mar. 8, 2021

(65) Prior Publication Data

US 2021/0281056 A1 Sep. 9, 2021

Related U.S. Application Data

(60) Provisional application No. 62/986,922, filed on Mar. 9, 2020.

(51) Int. Cl.
*H02G 3/12* (2006.01)

(52) U.S. Cl.
CPC .............. *H02G 3/125* (2013.01); *H02G 3/12* (2013.01)

(58) Field of Classification Search
CPC . H02G 3/125; A62C 35/68; F16L 3/02; F16L 3/24; F16B 2/06; F16B 2/18; F16B 2/22; F16B 2/065; F16B 2/245; F16B 7/04; F16B 7/0493; E04B 9/24; E04B 9/04; F16M 13/027
USPC ..... 248/200.1, 205.1, 906, 218.4; 52/506.06, 52/506.07, 506.08; 220/3.3, 3.5, 3.6, 3.9
See application file for complete search history.

(56) References Cited

U.S. PATENT DOCUMENTS

| 2,351,525 | A | * | 6/1944 | Leary | ..................... E04B 2/842 |
| | | | | | 52/285.3 |
| 2,854,205 | A | | 9/1958 | Kruger | |
| 3,144,733 | A | * | 8/1964 | Balinski | ................... E04B 2/56 |
| | | | | | 52/714 |
| 3,371,900 | A | | 3/1968 | Jacobs | |
| 3,720,395 | A | * | 3/1973 | Schuplin | ............... H02G 3/126 |
| | | | | | 248/228.7 |
| 3,816,880 | A | | 6/1974 | Jacobs | |
| 3,836,106 | A | * | 9/1974 | Gray | ......................... E04G 7/28 |
| | | | | | 248/229.26 |
| 4,041,657 | A | | 8/1977 | Schuplin | |
| 4,068,444 | A | * | 1/1978 | Ollinger | .................. E04B 9/065 |
| | | | | | 52/506.08 |

(Continued)

FOREIGN PATENT DOCUMENTS

KR 2008026074 A 3/2008
KR 1832213 B1 2/2018

(Continued)

*Primary Examiner* — Nkeisha Smith
(74) *Attorney, Agent, or Firm* — Quarles & Brady LLP

(57) ABSTRACT

A bracket system for securing an electrical box and other components to a ceiling structure can include a support structure and a mounting bracket. The mounting bracket can include a first support member and a second support member that define a support channel for slidably receiving the ceiling member. The mounting bracket can further include a first contact member and a second contact member that extend from the second support member and define a contact channel to slidably receive the attachment end of the support structure.

20 Claims, 9 Drawing Sheets

(56) References Cited

U.S. PATENT DOCUMENTS

| | | | |
|---|---|---|---|
| 4,088,293 A * | 5/1978 | Delmore | E04B 9/006 248/343 |
| 4,566,233 A * | 1/1986 | Naka | E04B 9/003 292/256.71 |
| 4,716,504 A | 12/1987 | Pahl et al. | |
| 4,723,749 A * | 2/1988 | Carraro | E04B 9/18 24/336 |
| 6,327,758 B1 * | 12/2001 | Petrakis | E04B 9/006 24/293 |
| 6,341,466 B1 | 1/2002 | Kehoe et al. | |
| 6,345,800 B1 | 2/2002 | Herst et al. | |
| 6,491,270 B1 * | 12/2002 | Pfaller | H02G 3/125 248/200.1 |
| 6,830,405 B2 * | 12/2004 | Watanabe | E04F 13/0826 403/11 |
| 7,234,674 B2 | 6/2007 | Rippel et al. | |
| 7,264,214 B2 | 9/2007 | Oh | |
| 7,278,243 B2 * | 10/2007 | Jones | E04B 9/068 52/287.1 |
| 7,510,159 B2 | 3/2009 | Rippel | |
| 7,673,841 B2 | 3/2010 | Wronski | |
| 7,735,794 B1 | 6/2010 | Gretz | |
| 7,735,795 B2 | 6/2010 | Wronski | |
| 7,779,593 B2 * | 8/2010 | Jahn | E04B 9/068 52/506.06 |
| 7,810,775 B2 * | 10/2010 | Dal Ponte | F21V 21/048 248/343 |
| 7,874,539 B2 * | 1/2011 | Wright | F04D 25/088 248/547 |
| 7,874,708 B1 | 1/2011 | Jones et al. | |
| 7,923,635 B2 | 4/2011 | Korcz et al. | |
| 7,930,864 B2 | 4/2011 | Wendt | |
| 8,038,113 B2 | 10/2011 | Fryzek et al. | |
| 8,079,561 B2 | 12/2011 | Jafari | |
| 8,091,721 B1 * | 1/2012 | Gretz | H02G 3/125 220/3.9 |
| 8,177,176 B2 | 5/2012 | Nguyen et al. | |
| 8,240,630 B2 | 8/2012 | Wronski | |
| 8,297,579 B1 * | 10/2012 | Gretz | H02G 3/263 248/343 |
| 8,403,289 B1 | 3/2013 | Rinderer | |
| 8,475,014 B2 | 7/2013 | Jones et al. | |
| 8,622,361 B2 | 1/2014 | Wronski | |
| 8,740,158 B2 * | 6/2014 | Silcox | A62C 35/68 248/75 |
| 8,889,984 B2 | 11/2014 | Korcz et al. | |
| 9,004,421 B2 * | 4/2015 | Feenstra | A62C 35/68 248/200.1 |
| 9,004,422 B2 * | 4/2015 | Feenstra | E04B 9/006 248/200.1 |
| 9,004,435 B2 | 4/2015 | Wronski | |
| 9,181,696 B1 * | 11/2015 | Bergman | E04B 9/068 |
| 9,239,131 B1 | 1/2016 | Wronski et al. | |
| 9,376,812 B2 * | 6/2016 | Porter | E04B 9/24 |
| 9,416,535 B1 | 8/2016 | Yaphe et al. | |
| 9,447,917 B1 | 9/2016 | Wronski et al. | |
| 9,470,360 B2 | 10/2016 | Korcz et al. | |
| 9,689,541 B2 | 6/2017 | Wronski | |
| 9,696,021 B2 | 7/2017 | Wronski | |
| 9,732,904 B1 | 8/2017 | Wronski | |
| 9,745,746 B2 * | 8/2017 | Heesbeen | E04B 9/30 |
| 9,809,976 B2 * | 11/2017 | Sareyka | E04B 9/127 |
| 9,822,926 B2 | 11/2017 | Nikayin et al. | |
| D821,849 S | 7/2018 | Nikayin et al. | |
| D841,432 S | 2/2019 | Nikayin et al. | |
| 10,288,238 B2 | 5/2019 | Yaphe et al. | |
| 10,408,247 B2 * | 9/2019 | Schulz | F16B 5/125 |
| 10,498,123 B2 | 12/2019 | Lupsa et al. | |
| 2010/0006723 A1 | 1/2010 | Yan | |
| 2010/0176138 A1 | 7/2010 | Zacharevitz et al. | |
| 2010/0196090 A1 * | 8/2010 | DeJong | F16B 5/065 403/373 |
| 2013/0192150 A1 * | 8/2013 | DuPont | F24S 25/634 52/173.3 |
| 2015/0159824 A1 | 6/2015 | Colan et al. | |
| 2016/0099555 A1 | 4/2016 | Nikayin et al. | |
| 2019/0195475 A1 | 6/2019 | Jones | |
| 2019/0301691 A1 | 10/2019 | Yaphe et al. | |
| 2019/0393688 A1 | 12/2019 | Laughlin et al. | |

FOREIGN PATENT DOCUMENTS

| | | |
|---|---|---|
| KR | 2019010205 A | 1/2019 |
| WO | 2018041495 A1 | 3/2018 |

* cited by examiner

BRACKET SYSTEM FOR MOUNTING ELECTRICAL BOXES

CROSS-REFERENCE TO RELATED APPLICATIONS

This application claims priority to U.S. Provisional Patent Application No. 62/986,922, titled "BRACKET SYSTEM FOR MOUNTING ELECTRICAL BOXES" and filed Mar. 9, 2020, the entirety of which is incorporated herein by reference.

BACKGROUND

In many applications, it may be useful to secure electrical boxes and other components to ceiling structures or other members. Conventionally, mounting brackets are used to secure various support structures, which may support an electrical box or component, to ceiling members.

SUMMARY

Some embodiments of the invention provide a bracket system for securing an electrical box to a ceiling structure. The ceiling structure can include a T-grid ceiling member with a base and a vertical stem that extends from the base. The bracket system can include a support structure and a mounting bracket. The support structure can include a support section to support the electrical box, and an attachment end. The mounting bracket can include a unitary bracket body including a first support member, a second support member, a first contact member, and a second contact member. The second support member can be connected to the first support member by a first arm and a second arm so that the first and second support members are resiliently movable relative to each other. The first support member, the second support member, the first arm, and the second arm together can define a support channel configured to slidably receive the vertical stem of the T-grid ceiling member. Further, free ends of the first support member and the second support member, opposite the first and second arms, can be configured to contact the base of the T-grid ceiling member when the vertical stem is received in the support channel. The first contact member and the second contact member can be resiliently moveable relative to each other and extend from the second support member away from the support channel, between the free end of the second support member and the first and second arms. The first contact member and the second contact member can define a contact channel configured to slidably receive the attachment end of the support structure (e.g., so that the first contact member extends beyond a shoulder of the support structure and the second contact member ends before the shoulder of the support structure).

Some embodiments of the invention provide a mounting bracket for use with a support structure for securing an electrical box to a ceiling structure. The ceiling structure can include a ceiling member with a base and a vertical stem, and the support structure can include an attachment end and a support section to support the electrical box. The mounting bracket can include a unitary bracket body that includes a first support member, a second support member, a first contact member, and a second contact member. The second support member can be connected to the first support member to define a support channel for slidably receiving the vertical stem of the ceiling member. A free ends of at least one of the first support member or the second support member, at an open end of the support channel, can be configured to contact the base of the ceiling member when the vertical stem is received in the support channel. Further, the first contact member and the second contact member can extend from the second support member, at a location spaced apart from the free end of the second support member and with the first contact member opposite the second contact member from the free end of the second support member, to define a contact channel for slidably receiving the attachment end of the support structure.

Some embodiments of the invention provide a method for securing an electrical box to a ceiling structure that includes first and second ceiling members, each with a base and a vertical stem. The method can include staging a support structure for installation by: attaching the support structure to a first mounting bracket and a second mounting bracket by: inserting a respective attachment end of the support structure into a contact channel of each of the first and second mounting brackets that is defined by first and second contact members of the respective first or second mounting bracket. Further, the method can include staging the support structure for installation by: supporting a first end of each of the first and second mounting brackets on a work surface, with the first and second mounting brackets in a first orientation. The method can further include attaching the first and second mounting brackets to the first and second ceiling members, with the first and second mounting brackets in a second orientation that is inverted relative to the first orientation, by sliding the first or second mounting brackets onto the first and second ceiling members, respectively, so that the vertical stem of the first or second ceiling member is received at a second end of the corresponding first or second mounting bracket in a support channel defined between first and second support members of the respective first or second mounting bracket.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
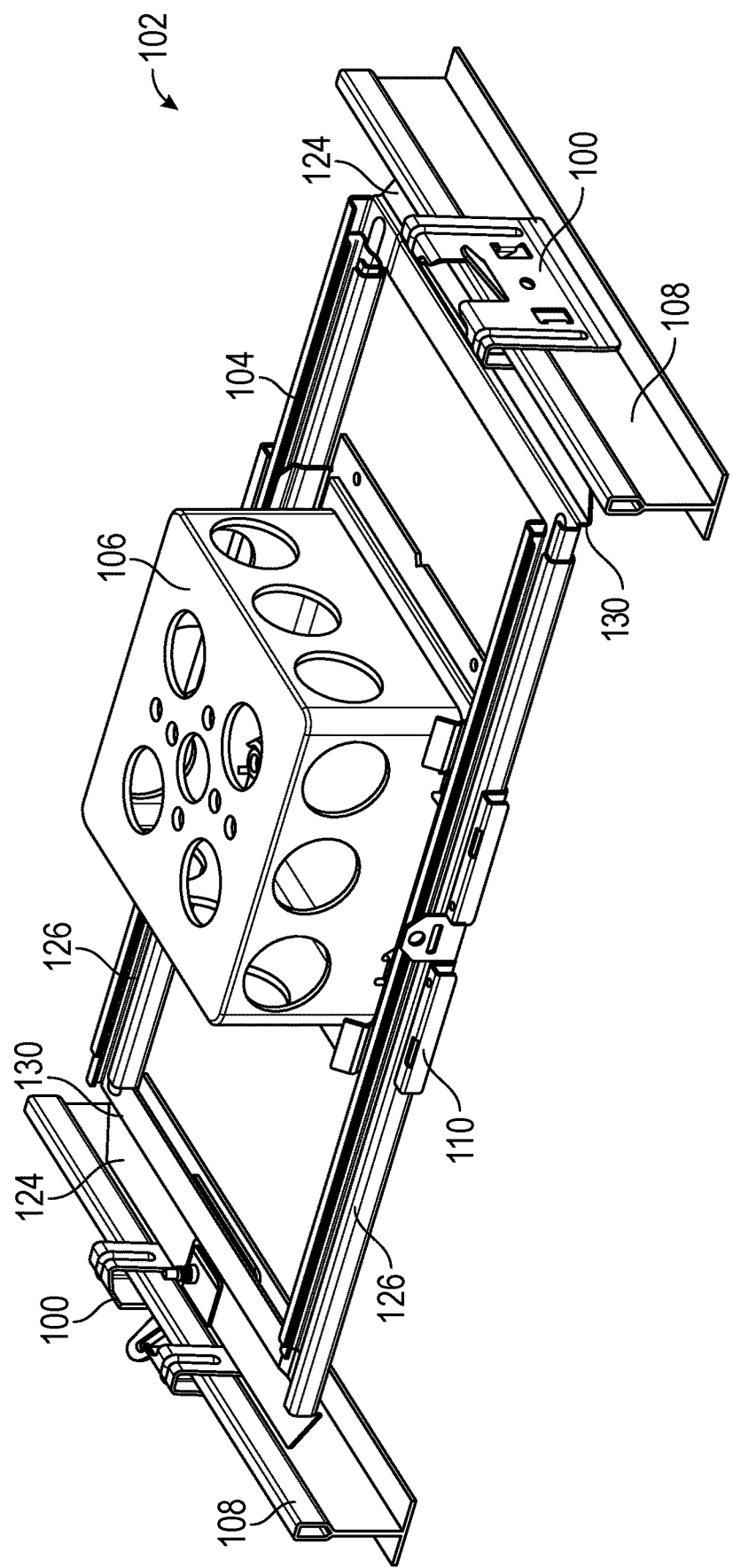
FIG. 1 is a top isometric view of a ceiling structure and a bracket system according to an embodiment of the invention, the bracket system including mounting brackets and a support structure, and the ceiling structure including ceiling members.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to secure or support components relative to certain structures. For example, electrical components, such as electrical boxes, may need to be mounted in a ceiling structure. Conventional mounting assemblies commonly use fasteners and mounting brackets to secure a support structure to areas of a ceiling structure. Using fasteners to secure a mounting bracket to a ceiling structure, however, can be undesirable because it can make installation difficult and less modifiable. Some conventional configurations have attempted to alleviate this problem by providing mounting brackets that can be secured to ceiling structures without fasteners, but these configurations often result in low retention strength. Further, securing conventional mounting brackets to support structures with fasteners is commonly a difficult, tedious task because stabilizing and supporting the structures during assembly is challenging due to their geometries.

In some contexts, it may be useful to secure or support components specifically relative to T-grid ceiling structures, in which ceiling members typically include a base and a vertical stem extending upwardly from the base. In different installations, the total length of the vertical stem may vary substantially. Accordingly, although some conventional brackets may securely engage a T-grid structure of certain stem lengths, these brackets may be less secure for other stem lengths. Therefore, contractors may be required to stock many different sizes of brackets to accommodate different sizes of T-grid stems, or may be forced to accept less secure attachment to some ceiling structures.

Embodiments of the invention can help alleviate these issue, and others. For example, embodiments of the invention may provide a mounting bracket that can be easily secured to a support structure to secure an electrical box or other device relative to building structures. Embodiments of the invention may also provide a mounting bracket that can be secured to a T-grid ceiling structure without additional hardware, such as fasteners, while providing enhanced retention over a variety of lengths of T-grid stems.

Embodiments of the invention are presented below in the context of support structures or brackets intended to secure electrical boxes to ceiling structures, including T-grid ceiling structures. Although these configurations can be particularly useful in some contexts, including due to the particular requirements for mounting electrical boxes to ceiling structures, other configurations are possible. For example, the principles disclosed herein can be used with support structures intended to secure any variety of mountable components, including light fixtures, vents, audio devices, fire alarms, and so on. Similarly, although some particular examples of T-grid structures are illustrated in the FIGS., some embodiments can be used with to other T-grid structures (e.g., with taller or shorter stems, or differently configured bulbs) or otherwise.

As noted above, embodiments of the present invention generally provide a bracket system for mounting and adjustably securing an electrical box or other object to a ceiling structure. For example, in the embodiment illustrated in FIG. 1, a pair of mounting brackets 100 are configured to be used in a bracket system 102 with a support structure 104 for securing an electrical box 106. In the embodiment illustrated, the support structure 104 is a telescoping ceiling bracket, however alternative structures or brackets may be used. For example, a support structure could be any structure that includes one or more substantially planar end portions that are configured to be receiving by a channel. Further, for example, a support structure could be any structure having one or more flanged portions that can be inserted into a channel or slot. Further, a support portion of a support structure, for example, can include any known type of configuration that is capable of supporting one or more electrical boxes or other components. Therefore, mounting brackets according to embodiments of the present disclosure can be used to support or secure a variety of structures, including structures not expressly illustrated herein.

The mounting brackets 100 are configured such that they may secure the support structure 104 to a ceiling structure, which includes two ceiling members 108 in the embodiment illustrated. Although the bracket system 102 according to the present embodiment is illustrated with two mounting brackets 100, any number of mounting brackets may be used in other installations. For example, in some instances, the bracket system may include one, three, or four mounting brackets. Further, in some embodiments, sets of substantially identical mounting brackets can be used to simplify installation procedures and reduce complications for inventory management. In this regard, for example, only one of the mounting brackets 100 will be described in detail below, although some configurations may include multiple types of mounting brackets.

As will be described in greater detail herein, each of the support structure 104 and the mounting brackets 100 are configured so that they may be easily assembled prior to installation into a ceiling structure (e.g., onto the ceiling members 108). Specifically, the support structure 104 and the mounting brackets 100 can be assembled together on a work bench or other surface before being attached to the ceiling members 108, and the mounting brackets 100 may be attached to the ceiling members 108 without additional hardware, such as fasteners. Thus, the mounting brackets 100 can be removably secured to the ceiling members 108 in some cases. Further, the support structure 104 is generally provided to support an object (e.g., the electrical box 106) at a particular height relative to the ceiling members 108. Although the specific embodiments discussed herein illustrate the support structure 104 supporting the electrical box 106 with a support bracket 110, it should be understood that other brackets or structures may be used.

Figure 2:
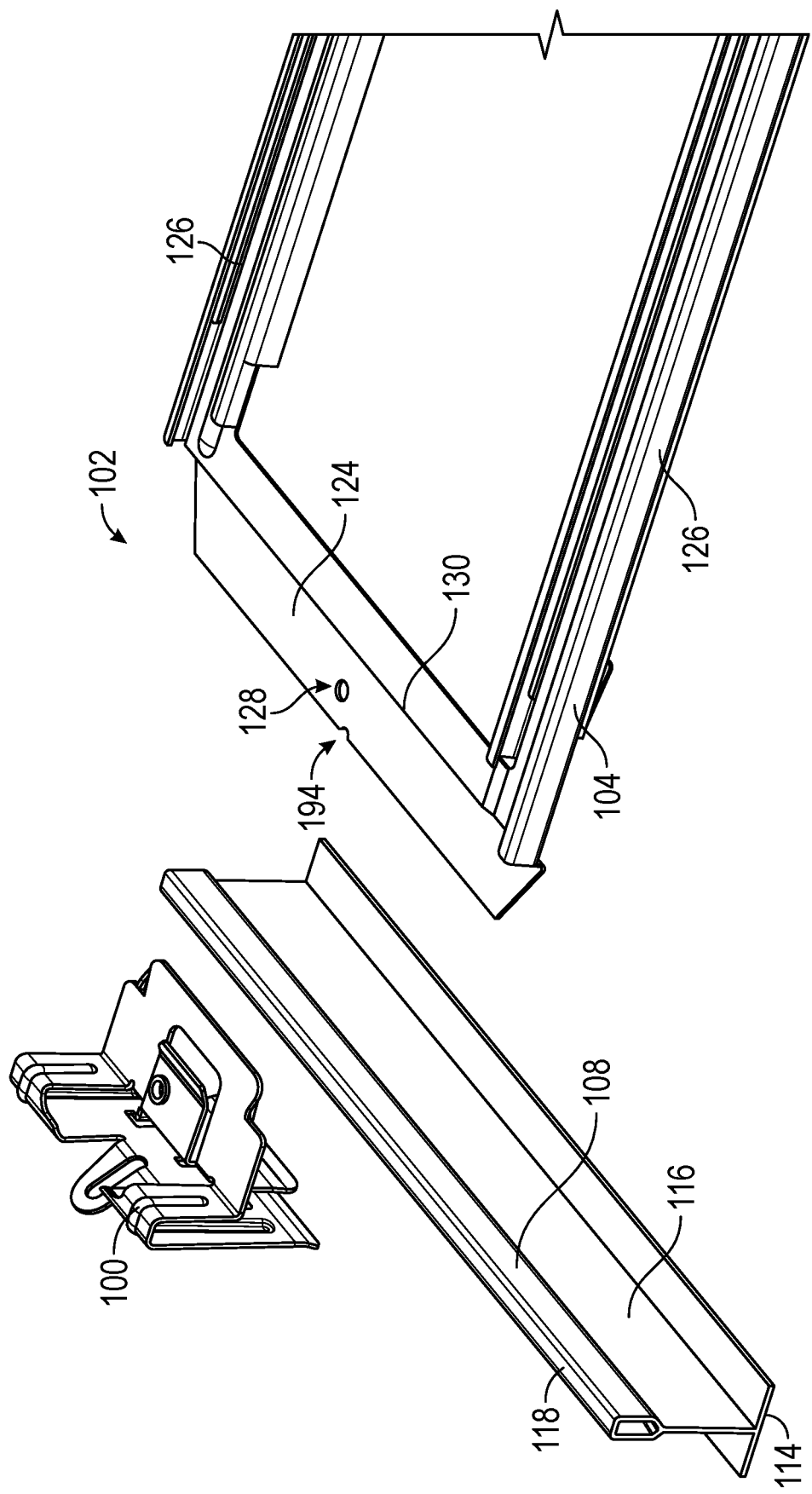
FIG. 2 is an exploded top isometric partial view of the bracket system and the ceiling structure of FIG. 1.

In different installations, mounting brackets according to embodiments of the invention can be readily secured to a variety of ceiling structures. For example, FIGS. 1 and 2 illustrate aspects of a particular configuration of the ceiling member 108 that may be used with the mounting bracket 100 according to embodiments of the present disclosure. The illustrated ceiling member 108 is provided for example purposes only, and other configurations are possible. Referring particularly to FIG. 2, in the embodiment illustrated, the ceiling member 108 includes a flat base 114 and a vertical stem 116 extending substantially perpendicularly from the flat base 114 to a widened top 118. Although the ceiling member 108 according to the present embodiment is a T-grid bar that includes the vertical stem 116 with the widened top 118, a variety of other configurations are possible. For example, the bracket system 102 according to the present invention may be configured to mount to any variety of a ceiling member or non-ceiling members. However, some embodiments may be particularly well suited for use with T-grid ceiling members, including due to the ability to accommodate a wide variety of heights of the vertical stems thereof.

Generally, support structures according to the invention can include a variety of support rail configurations with ends that allow attachment to a mounting bracket. Returning to FIG. 1, the support structure 104 according to the present embodiment is a ceiling bracket that is substantially rectangular in shape and includes two attachment ends 124 connected by two elongate support rails 126. The two elongate support rails 126 extend substantially parallel to each other and define a support section that is provided to support components, such as the electrical box 106. Further, in the embodiment illustrated, the two elongate support rails 126 are telescoping (i.e., their lengths may be selectively adjusted), although alternative configurations are possible. The two ends 124 are symmetrical about the elongate support rails 126, and, accordingly, the two ends 124 share substantially identical aspects.

As best shown in FIG. 2, each of the ends 124 (only one shown in FIG. 2) is a thin, elongate, substantially planar section that is configured to be received by and secured to the mounting bracket 100. The end 124 further includes a hole 128 that is configured to receive a fastener, such as a screw or a bolt, which will be described in greater detail below. Moreover, a shoulder 130 is disposed at a junction between each of the ends 124 and the support section, e.g., elongate support rails 126. In some embodiments, the shoulder 130 may be used to secure the support structure to the mounting bracket 100, an example of which will be described below. However, other configurations for support structures, including their ends and support sections, are possible. For example, in some embodiments, ends of a support structure may be non-planar or may not include a shoulder as shown in FIG. 2.

Figure 3:
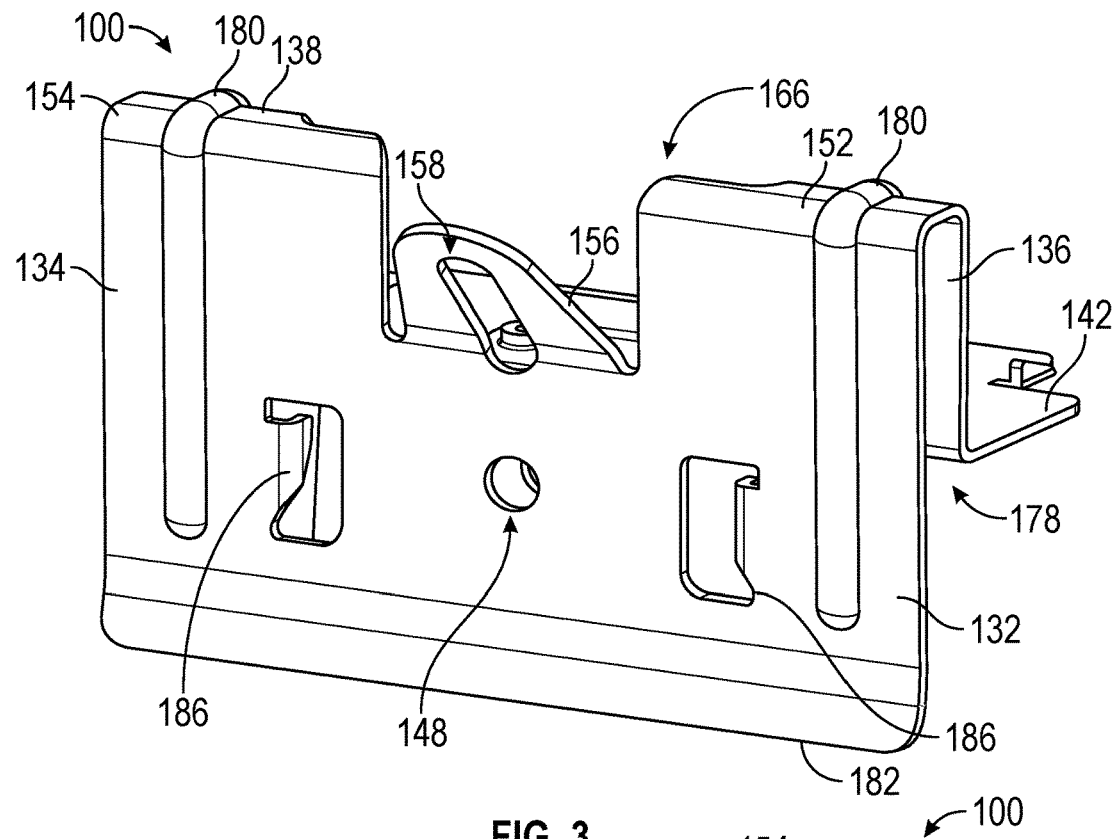
FIG. 3 is a rear isometric view of the mounting bracket of FIG. 1.
Figure 4:
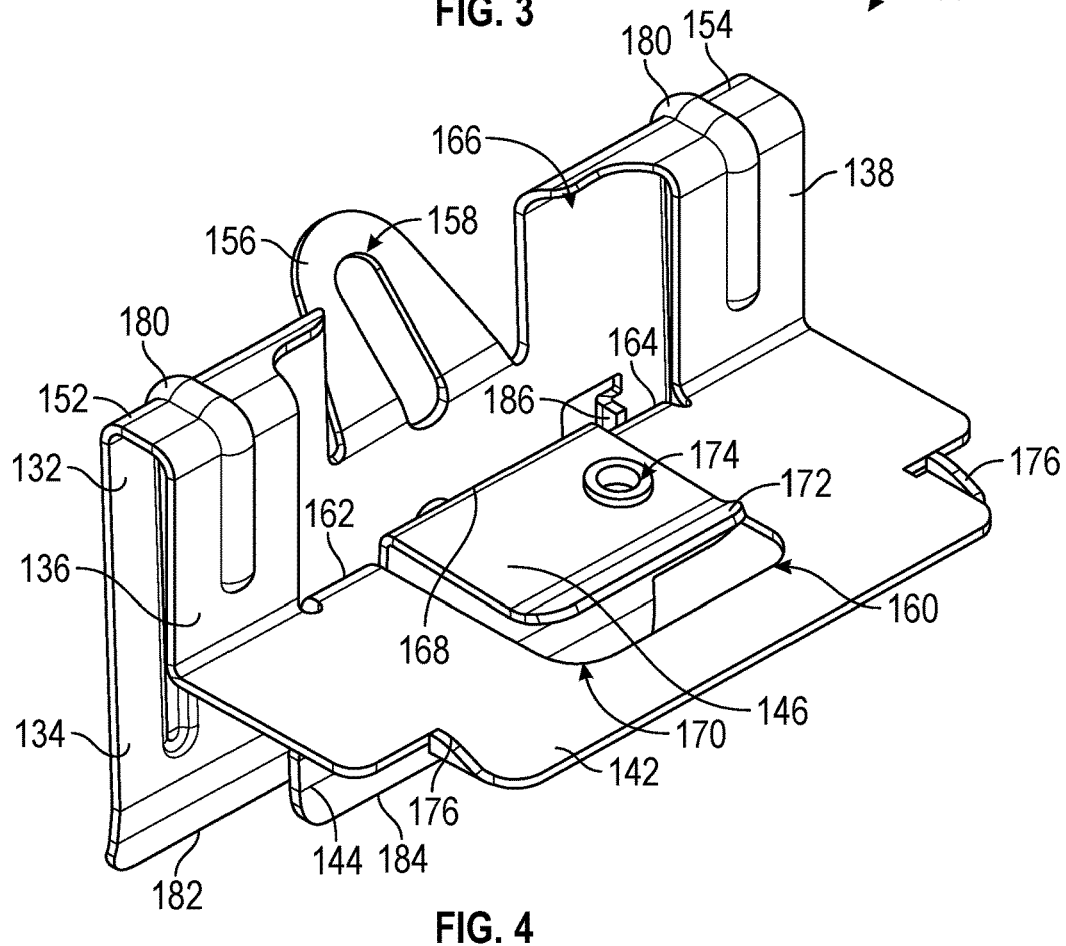
FIG. 4 is a front isometric view of the mounting bracket of FIG. 3.
Figure 5:
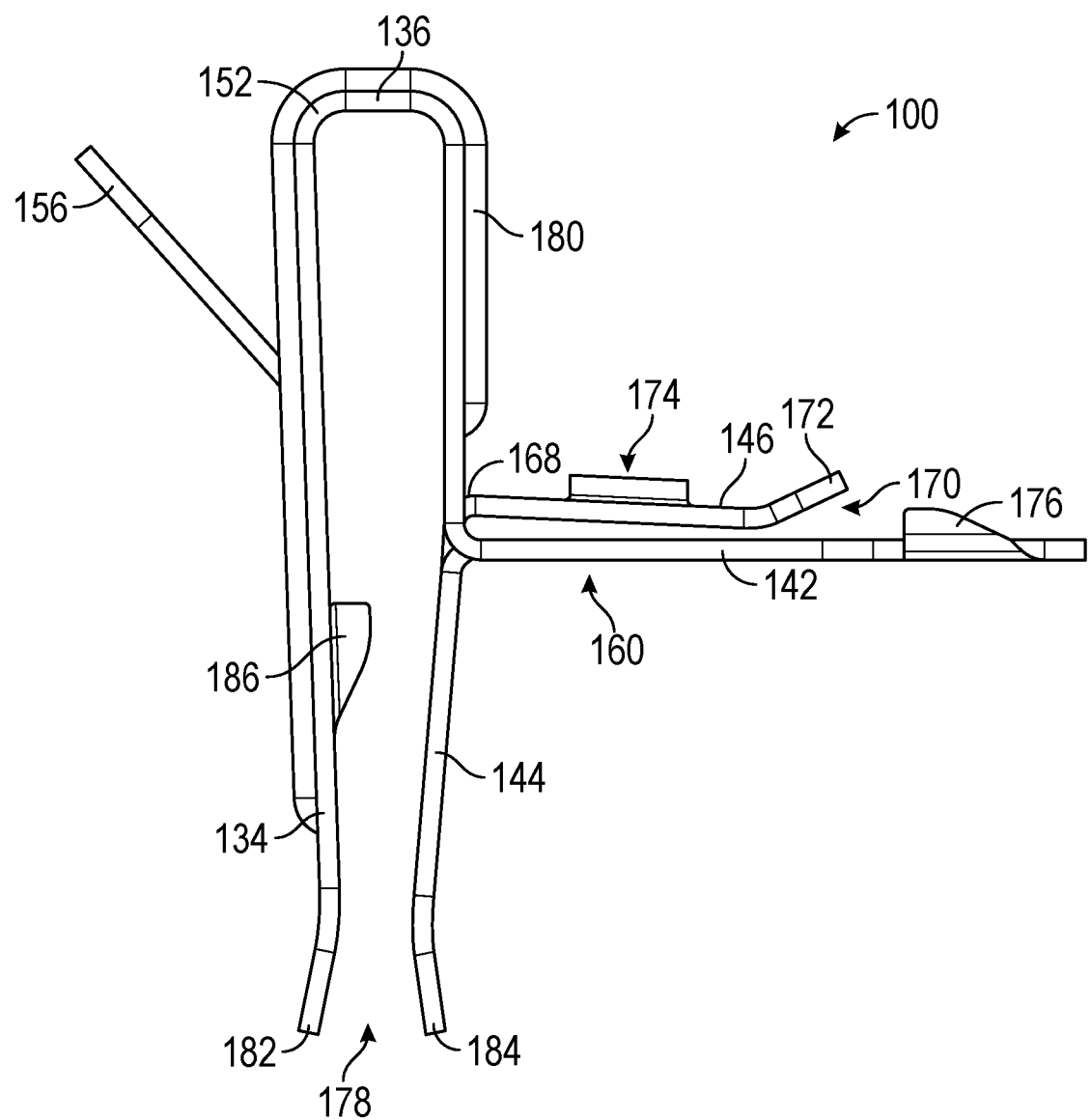
FIG. 5 is a side elevation view of the mounting bracket of FIG. 3.

FIGS. 3-5 illustrate an example configuration of the mounting bracket 100 for use in the bracket system 102 of FIGS. 1 and 2 according to an embodiment of the invention. Referring to FIG. 3, the mounting bracket 100 is formed as a stamping from a single blank, which is bent to form a three-dimensional bracket body, although a variety of other approaches are possible. Accordingly, the mounting bracket 100 is integrally formed as a single unitary component. In some embodiments, a mounting bracket can be formed from spring steel. In some cases, spring steel may be particularly suitable, due to its high degree of elasticity and significant load strength. Furthermore, in some embodiments, a mounting bracket may be heat treated. For example, a mounting bracket can be formed from spring steel that is through hardened to enhance a hardness and tensile strength of the mounting bracket material. Other heat treatments may alternatively be used.

With continued reference to FIG. 3, the mounting bracket 100 has a bracket body 132 that includes a first support member 134. As best seen in FIG. 4, the bracket body 132 further includes a first arm 136 and a second arm 138 extending from the first support member 134, a first contact member 142 extending from the first arm 136 and the second arm 138, a second support member 144 extending from the first contact member 142, and a second contact member 146 extending from the second support member 144. Again, each of the first support member 134, the first arm 136, the second arm 138, the first contact member 142, the second support member 144, and the second contact member 146 are integrally formed as part of a single component, and are a result of stamping and bending a blank material, e.g., spring steel. In different embodiments, different arrangements and geometries are possible for the components noted above.

Still referring to FIG. 3, the first support member 134 is substantially planar, extending substantially along a single plane defined by the first support member 134. In the embodiment illustrated, the first support member 134 includes a hole 148 (e.g., for use as a locating feature during stamping operations), but other configurations are possible. As best seen in FIG. 4, the first arm 136 extends from a first edge 152 of the first support member 134 substantially perpendicularly, and then bends so that at least a portion of the first arm 136 extends along and adjacent the first support member 134. The first edge 152 is generally a bend line that is formed by bending the first arm 136 relative to the first support member 134. Accordingly, the first edge 152 includes a radius of curvature, which may be between about 1.3 mm and 3.5 mm in some embodiments, but other configurations are possible. Referring to FIG. 5, in some embodiments, at least a portion of the first arm 136 may extend substantially parallel to the first support member 134. In some embodiments, the first arm 136 and the first support member 134 may form an angle less than 10 degrees, less than 20 degrees, or less than 30 degrees.

As best seen in FIG. 4, the second arm 138 similarly extends from a second edge 154 of the first support member 134 substantially perpendicularly, and then bends so that at least a portion of the second arm 138 extends along and adjacent the first support member 134, the first edge 152 and the second edge 154 being substantially collinear. Thus, the second edge 154 is generally a bend line that is formed by bending the second arm 138 relative to the first support member 134. The second edge 154 may have a radius of curvature between about 1.3 mm and 3.5 mm, but other configurations are possible. Like the first arm 136, at least a portion of the second arm 138 may extend substantially parallel to the first support member 134. In some embodiments, the second arm 138 and the first support member 134 may form an angle less than 10 degrees, less than 20 degrees, or less than 30 degrees.

Still referring to FIG. 4, a tab 156 having a slot 158 can extends from the first support member 134 between the first and second arms 136, 138 and the first and second edges 152, 154. Generally, the slot 158 of the tab 156 is provided to receive cables or wires to bear the weight of a support structure and any component provided thereon, thereby decreasing loads on a ceiling structure (e.g., to comply with seismic regulations). While the tab 156 is integrally formed with the first support member 134 in the illustrated embodiment, tabs or elements for receiving cables or wires to wear the weight of the support structure or components may be individually fabricated and coupled to a bracket body in alternative embodiments. Further, while the tab 156 is bent away from the first support member 134 and the first and second arms 136, 138 in the illustrated embodiment, other configurations are possible. For example, a mounting bracket may include a tab that is substantially coplanar with the first support member in some embodiments.

The first contact member 142 is attached to the first and second edges 152, 154 of the first support member 134 by the first and second arms 136, 138. Therefore, via the first and second arms 136, 138, the first contact member 142 can resiliently move relative to, yet remain coupled to, the first support member 134. The first contact member 142 can be established by bending a portion of material relative to the first and second arms 136, 138. Thus, bend lines can be defined at a junction between the first contact member 142 and the first and second arms 136, 138. In the illustrated embodiment, for example, the first contact member 142 is substantially planar, extending substantially along a single plane defined by the first contact member 142, connecting the first and second arms 136, 138, and defining an opening 160 therebetween. For example, the opening 160 may be a stamped opening that substantially corresponds to the second contact member 146, which will be described in greater detail below.

The second support member 144 extends from third and fourth edges 162, 164 of the first contact member 142 in a direction opposite the first and second arms 136, 138. Generally, the second support member 144 corresponds to a stamped opening 166 defined between the first and second arms 136, 138. For example, the material blank can be stamped to define an outline of the stamped opening 166, which also corresponds to the second support member 144. Accordingly, the second support member 144 can be bent away from the first and second arms 136, 138 about the first contact member 142, thereby creating the stamped opening 166.

Referring to FIG. 5, in some embodiments the second support member 144 and at least portions of the first and second arms 136, 138 may be substantially disposed in a common plane defined by the second support member 144. That is, the second support member 144 and the first and second arms 136, 138 may be bent away from each to form an angle of about 180 degrees. In some embodiments, the angle may be between 160 degrees and 200 degrees or between 170 degree and 190 degrees.

Returning to FIG. 4, accordingly, the third and fourth edges 162, 164 are bend lines defined between the first contact member 142 and the second support member 144. Further, in the illustrated embodiment, the third and fourth edges 162, 164 are disposed laterally inward from the first and second arms 136, 138. Thus, the second support member 144 can extend substantially perpendicularly (i.e., within 10 degrees of perpendicular) from the first contact member 142 laterally between and vertically opposite the first and second arms 136, 138. The second support member 144 similarly is substantially planar, extending substantially along a single plane defined by the second support member 144. Further, in the illustrated embodiment, as shown in FIG. 5 in particular, the first contact member 142 extends substantially perpendicularly to the channel 178 (and substantially in parallel with a plane defined between free ends of the first and second support members 134, 144, as further discussed below), so that the first contact member 142 can extend substantially perpendicularly to a stem of a T-grid member (or substantially in parallel with a T-grid base) when installed and thereby, for example, provide an extended horizontal support for a support structure that is supported by the mounting bracket 100.

Referring again to FIG. 4, the second contact member 146 extends from a fifth edge 168 of the second support member 144, which is disposed between the third and fourth edges 162, 164 and, thus, the first and second arms 136, 138. Generally, the second contact member 146 corresponds to the stamped opening 160 defined by the first contact member 142. The second contact member 146 thus can be formed by bending a portion of material stamped from the stamped opening 166. More specifically, the second contact member 146 in the illustrated embodiment is defined by bending the material about the fifth edge 168, relative to the second support member 144.

The second contact member 146 extends substantially along a single plane defined by the second contact member 146 from the fifth edge 168 in a direction similar to the first contact member 142. However, as best seen in FIG. 5, the second contact member 146 is generally elevated relative to the plane of the first contact member 142 to define a contact channel 170. Although the second contact member 146 is generally elevated relative to the first contact member 142, it may still maintain alignment with the stamped opening 166. That is, the second contact member 146 may be at least partially aligned with a profile of the stamped opening 166 (see, e.g., FIG. 4).

The contact channel 170 generally extends between the first contact member 142 and the second contact member 146 to allow for insertion of a component to be secured to the bracket body 132 (e.g., the support structure 104 of FIG. 2). Additionally, in the illustrated embodiment, the second contact member 146 includes an outwardly flared distal end 172 and ends closer to the arms 136, 138 than does the first contact member 142. In some cases, this configuration can further assist insertion of a component into the contact channel 170. However, other configurations are possible, including, but not limited to, configurations without an outwardly flared distal end.

Still referring to FIG. 5, the second contact member 146 is generally configured to move relative to, yet remain coupled to, the first contact member 142. Therefore, when (or as) a component, such as the support structure 104 (see, e.g., FIG. 2) is inserted therebetween, the first and second contact members 142, 146 resiliently separate. The second contact member 146 further includes a fastener attachment configured hole 174 that is sized to receive the body of a screw or other type of fastener. Therefore, preferably, the first and second contact members 142, 146 are configured to hold an end of a component until a fastener is inserted into the hole 174.

In the illustrated embodiment, the hole 174 is formed as part of an extruded feature that is integrally formed with the second contact member 146. In other embodiments, other configurations are possible. For example, some attachment features may include similar openings that are not included on an extrusion. In some embodiments, attachment features can included threaded openings, or can include non-threaded openings that provide sufficient contact area for suitable engagement by a self-tapping screw (e.g., an extrusion that is at least as thick as the feature from which it extends).

In the illustrated embodiment, the second contact member 146 extends from the fifth edge 168 to the distal end 172 at a slight angle toward the first contact member 142. That is, the second contact member 146 is spaced farther from the first contact member 142 proximate the fifth edge 168 than it is proximate the distal end 172 (but not at the distal end 172, due to the flared configuration of the illustrated embodiment). Thus, when a component is inserted between the first and second contact members 142, 146, the contact members 142, 146 may resiliently clamp the component therebetween, as can help to secure the component until a fastener, or other securing element, is added (and thereafter).

Additionally, in the embodiment illustrated, the first contact member 142 further includes a pair of contact tabs 176 that extend away from the first contact member 142 in a direction toward the second contact member 146. The contact tabs 176 are generally provided to engage a component that is received within the contact channel 170 to help to secure the component within the contact channel 170. For example, as illustrated, the contact tabs 176 are configured to catch or contact portions of a bracket, such as, e.g., the shoulder 130 disposed at the end 124 of the support structure 104 shown in FIG. 2. Although the present embodiment illustrates two contact tabs 176 (see, e.g., FIG. 4), other embodiments may include more, fewer, or no contact tabs, or may include tabs that are formed on a contact member other than at an edge thereof. Further, alternative embodiments may incorporate other elements, either integrally formed or separate, for securing or catching a portion of a component.

Still referring to FIG. 5, the first support member 134, the second support member 144, the first arm 136, and the second arm 138 (not shown in FIG. 5) together define a support channel 178 which is configured to receive a structure, such as, e.g., the ceiling member 108 of FIG. 2. The first arm 136 and the second arm 138 are configured so that the mounting bracket 100 can resiliently flex to allow insertion of components into the support channel 178. For example best seen in FIG. 4, each of the first arm 136 and the second arm 138 of the illustrated embodiment includes a rib 180 that extends substantially along a length of the arm to increase the strength of the arm.

Further, in the embodiment illustrated, free ends of the first support member 134 and the second support member 144 include a first support edge 182 and a second support edge 184, respectively, which are configured to be seated on (e.g., directly contact) a surface of a ceiling member. In the illustrated embodiment, the first support edge 182 and the second support edge 184 are substantially equally spaced from a base of the support channel 178, but other configurations are possible. Further, both the first support edge 182 and the second support edge 184 are outwardly flared to assist insertion of a ceiling member therein in the illustrated embodiment. That is, the first support member 134 and the second support member 144 gradually curve (e.g., angle) away from each other proximate the first support edge 182 and the second support edge 184 to allow for gradual insertion of a ceiling member and enhance retention thereof. However, other configurations are possible.

To further enhance retention, according to some embodiments, the first and second support members 134, 144 may include additional engagement features. For example, in the illustrated embodiment, the first support member 134 includes engagement tabs 186 that extend inwardly into the support channel 178, in a direction toward the second support member 144. The engagement tabs 186 are provided to catch or contact portions of a ceiling member, such as, e.g., the widened top 118 of the ceiling member 108 shown in FIG. 2, or the stem 116. Although the illustrated embodiment includes two engagement tabs 186 (see, e.g., FIG. 3), more or fewer (e.g., no) engagement tabs may be used on some support members. Further, other configurations of engagement features may be used in alternative embodiments.

Figure 6:
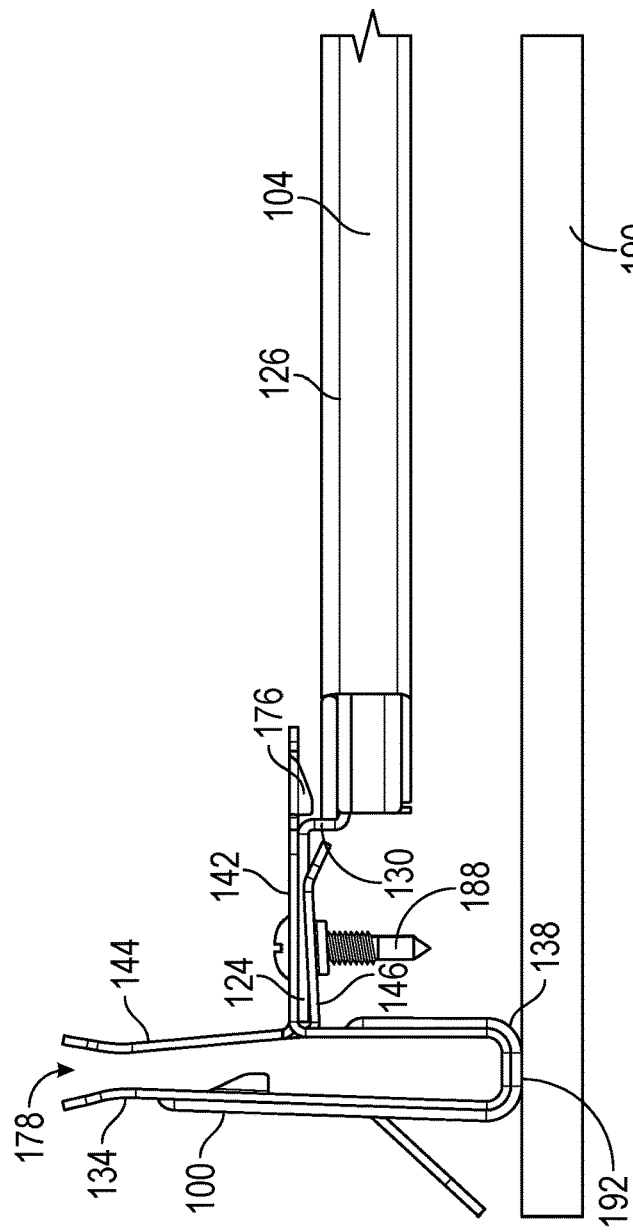
FIG. 6 is a front elevation partial view of a bracket system including the mounting bracket of FIG. 3 mounted to the support structure of FIG. 1, in a first orientation during an installation process, inverted relative to a second orientation shown in FIG. 1.

Turning to FIG. 6, as mentioned above, the mounting bracket 100 is configured to allow easy installation of a support system for an electrical box or other component. For example, the mounting bracket 100 is configured to slide onto the end 124 of the support structure 104. In the illustrated embodiment, the mounting bracket 100 can be slid onto the support structure 104 so that the contact channel 170 receives the end 124 until the contact tabs 176 pass over the shoulder 130 of the support structure 104. For example, the first contact member 142 may extend beyond the shoulder 130, whereas the second contact member 146 may end before the shoulder 130. Accordingly, the contact tabs 176 can engage the shoulder 130, thereby preventing unintentional disconnection of the mounting bracket 100 and the support structure 104. Because the first and second contact members 142, 146 of the mounting bracket 100 are configured to clamp the support structure 104 (as also discussed above), and the contact tabs 176 are configured to retain the end 124 within the contact channel 170 via engagement with the shoulder 130, the mounting bracket 100 securely holds the support structure 104 in place until a fastener (e.g., screw 188) is installed (as needed).

Figure 7:
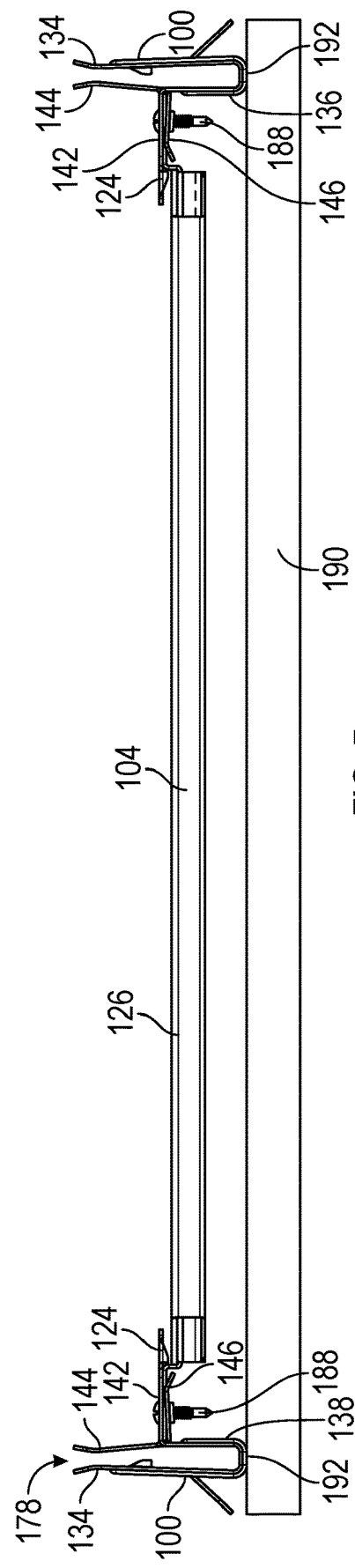
FIG. 7 is a front elevation view the bracket system of FIG. 6 in a staged configuration, including the mounting brackets of FIG. 1 mounted to the support structure of FIG. 1.

Additionally, the mounting bracket 100 is configured to be stably supported by a support surface, such as, e.g., work bench 190, while the screw 188 is being inserted. For example, the first and second arms 136, 138 of the mounting brackets 100 each include a flat section 192 that creates a base on which the mounting bracket 100 can be stabilized. The flat sections 192 can be formed by bending the first and second arms 136, 138 so that a base of the support channel 178 can stabilize the mounting bracket 100. Therefore, in an instance where two mounting brackets 100 are being attached to the support structure 104 (e.g., to stage the support structure 104 for installation), as shown in FIG. 7, the mounting brackets 100 can support and balance the support structure 104 in an inverted position while the screws 188 are being attached thereto. Further, in the illustrated orientation, due to the configuration of the first and second contact members 142, 146, including the holes 174 and the openings 160, a user can easily align and then secure the support structure 104 to the mounting brackets 100 with hand tools and screws. Thus, the screws 188 may be installed when the mounting brackets 100 and the support structure are in a staged configuration, as shown in FIG. 7. Generally, a "staging" of a support structure can include a variety of operations in which the support structure is secured to other components or otherwise arranged for easier installation, before being actually attached in a final location (e.g., attached to a ceiling grid).

In the illustrated example, as generally illustrated in FIGS. 3-6, the flat sections 192 themselves extend within a common plane and also position the support ribs 180 to extend within a common plane, in parallel with the plane of the flat sections 192. Correspondingly, the flat sections 192 and, more specifically, the support ribs 180 can provide a stable base for support of the mounting bracket 100 during an installation process (see, e.g., FIG. 7, in which the common plane extends along the work bench 190). In some embodiments, first and second arms (or other features) may provide similar structures that extend within a common plane to provide support for a larger assembly, in an inverted orientation, during an installation process, but that are not necessarily flat or that do not necessarily include support ribs. In some embodiments, such a common plane (e.g., as shown in FIG. 5) may extend in parallel with one or more of a plane defined by a contact channel (or one or more contact members) or a plane defined by free ends of support members, so that mounting brackets at opposing ends of a generally planar support structure can stably support the support structure during an installation process (e.g., as shown in FIG. 5) with the support structure in a horizontal orientation.

In the embodiment illustrated, the mounting bracket 100 is configured so that the screw 188 can be fastened to the mounting bracket 100 and the support structure 104 by inserting it from proximate the first and second support edges 182, 184, through the stamped opening 160, through an opening defined by the end 124 of the support structure 104, and subsequently through the hole 174 defined by the second contact member 146. In some installations, a separate threaded nut may be secured to the fastener. In some installations, however, a threaded nut may be integral with the mounting bracket, e.g., with the second contact member, as part of a fastener attachment structure. Once the assembly is completed, and the support structure 104 and mounting brackets 100 are staged for installation (e.g., as shown in FIG. 7), the entire assembly can be transported together, then inverted and slid into engagement with a ceiling structure (e.g., as shown in FIG. 1).

Figure 8:
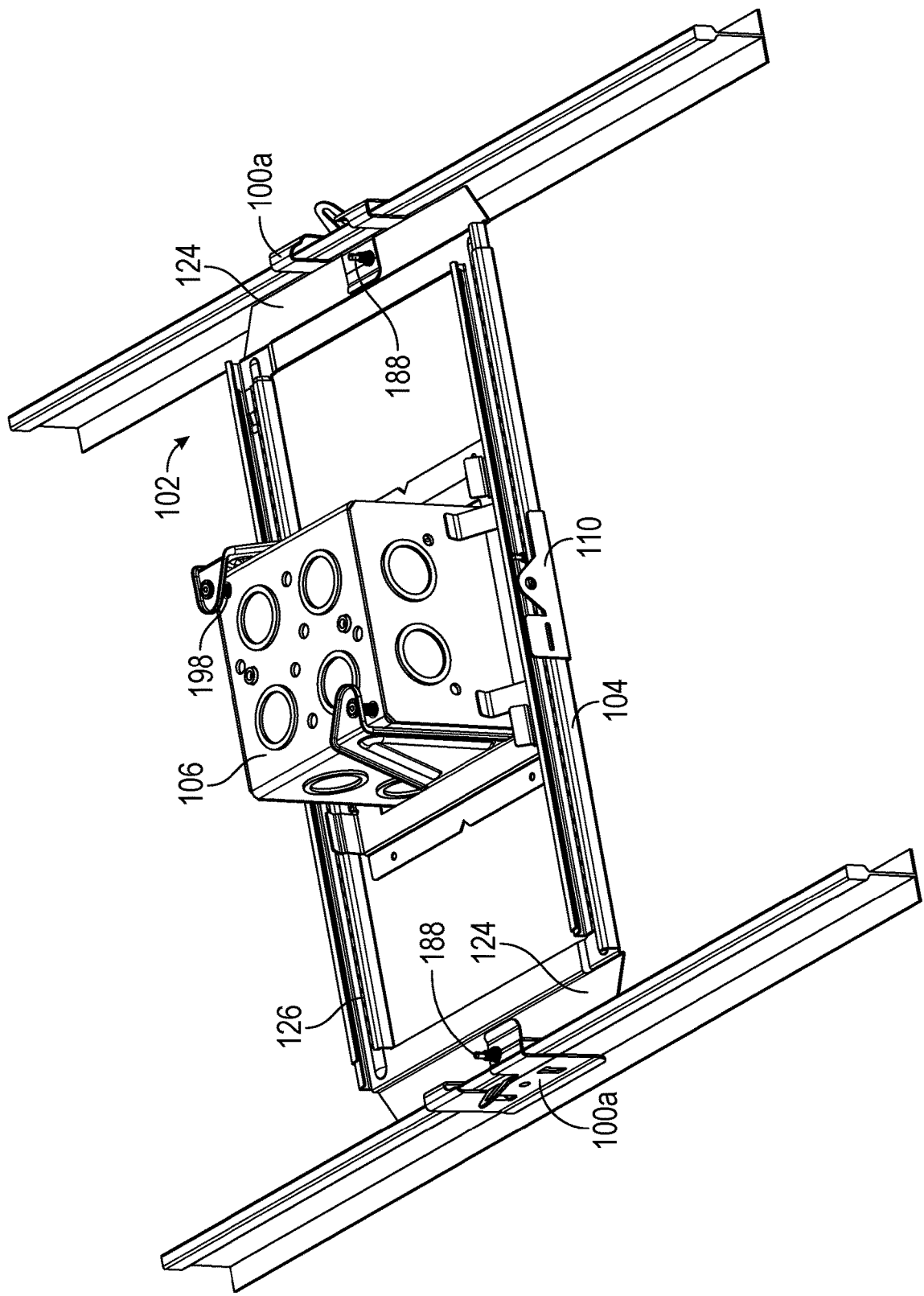
FIG. 8 is a top isometric view of an electrical box mounted to another bracket system according to an embodiment of the invention, similar to the bracket system of FIG. 1.

In the embodiment illustrated, each of the screws 188 (and, accordingly, the hole 174 shown in FIG. 4), is offset to accommodate features of the support structure 104. Specifically, returning to FIG. 2, the illustrated support structure 104 includes a notch 194 at each end 124 thereof. Thus, as best seen in FIG. 8, the screw 188 is offset to help to preserve maximum structural integrity of the support structure 104. In other embodiments, however, similar holes and corresponding screws may be positioned to accommodate any number of design features. Additionally, while the mounting bracket 100 according to the illustrated embodiment uses a single fastener to secure the support structure 104 within the contact channel 170, other configurations are possible. For example, more or fewer fasteners may be used. Additionally or alternatively, other embodiments may incorporate different features, such as, e.g., pins, latches, clamps, adhesives, or the like, to removably or permanently secure a mounting bracket to a support structure.

In some embodiments, before an assembly such as is shown in FIG. 7 is attached to a building structure (or at various times thereafter), further hardware can be secured thereto. For example, FIG. 8 illustrates an isometric view of a pair of mounting brackets 100a, similar to the brackets 100, that are coupled to the support structure 104 in an upright orientation (i.e., as inverted relative to the orientation shown in FIG. 7 for the mounting brackets 100) as can facilitate collective, simultaneous installation onto a T-grid ceiling. Additionally, the support bracket 110 has been attached to the support structure 104 to adjustably support the electrical box 106 thereon. In some embodiments, a bracket such as the support bracket 110 can be installed onto the ends 124 of the support structure 104 prior to installation of the brackets 100a onto a ceiling structure.

Figure 9:
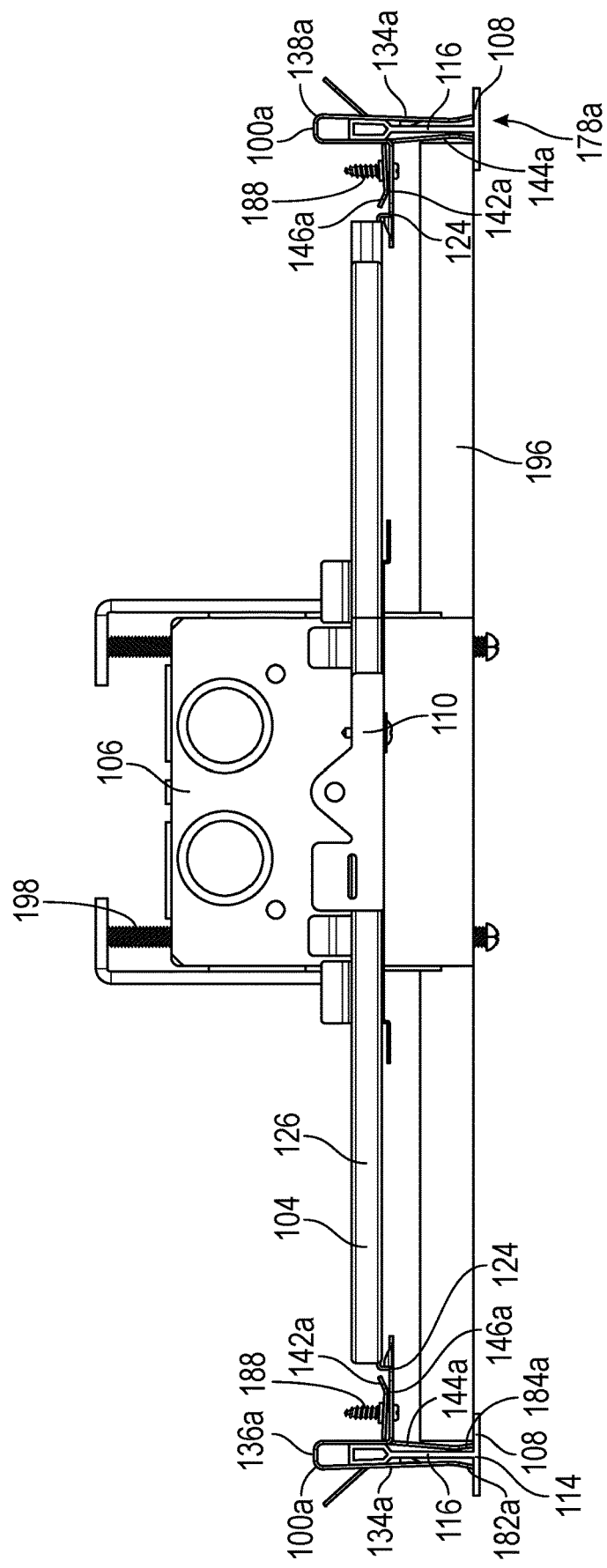
FIG. 9 is a front elevation view of the electrical box and the bracket system of FIG. 8 mounted to the ceiling structure of FIG. 1.

Referring to FIG. 9, the mounting brackets 100a may be secured to a ceiling structure, such as, e.g., the ceiling members 108. For example, the mounting brackets 100a are configured to slide (e.g., snap) onto the ceiling members 108. Specifically, the support channel 178a of each mounting bracket 100 is configured to receive the vertical stem 116 of the corresponding ceiling member 108 so that the first support member 134a and the second support member 144a are disposed on opposing sides of the vertical stem 116. Further, the first and second support edges 182a, 184a of the mounting bracket 100a contact or are otherwise supported by the flat base 114 of the ceiling member 108 when the mounting brackets 100a are fully mounted thereto. In some installations, however, it is possible for support edges of a mounting bracket not to contact a base of a ceiling member. For example, in some installations, a vertical stem of a ceiling member may be longer than a depth of a support channel of a mounting bracket. Thus, when secured to the ceiling member, a top of the vertical stem may contact a base of the contact channel, which may prevent the support edges of the mounting bracket from engaging the base of the ceiling member.

In the embodiment illustrated, the first and second contact members 142a, 146a are configured so that the support structure 104 is secured approximately 1 inch from the first and second support edges 182a, 184a, and, accordingly, also from the flat base 114 of the ceiling member 108, measured substantially perpendicularly from the flat base 114. However, alternative embodiments may have different dimensions. For example, the first and second contact members may be space approximately 0.5, 1.5, or 2 inches from the first and second support edges, and, thus, the flat base of the ceiling member. In some embodiments, the first and second contact members may be at least 1 inch from the first and second support edges. In some embodiments, the first and second contact members may be less than 2 inches from the first and second support edges.

As discussed above, the screws 188 coupled thereto can be installed while the mounting brackets 100*a* and the support structure 104 are in the inverted position, while being staged for installation (see, e.g., FIG. 7). Therefore, when the mounting brackets 100*a* and the support structure 104 are upright, such as when installed on the ceiling members 108, the screws 188 are inverted so that a head 202 of the screw 188 is disposed below a body 204 of the screw 188, from the perspective shown in FIG. 9. This configuration may prevent the screws 188 from interfering with other ceiling components, such as, e.g., ceiling tile 196. Similarly, the balanced configuration of the mounting brackets, to stably support a larger assembly in an inverted orientation before final installation, can allow screws to be easily installed in the noted beneficial orientation.

The support structure 104 is generally configured to support components, such as the electrical box 106 and the support bracket 110. Support structures in other embodiments may be configured to support more, fewer, or different components than the ones illustrated in the present embodiment. In some embodiments, the support bracket 110 may be configured to adjustably support the electrical box 106 relative to the ceiling members 108. For example, the support bracket 110 may be slidably adjustable along a length of the support structure 104. Further, the support bracket 110 may be configured to selectively adjust a height of the electrical box 106 relative to the support bracket 110 and the ceiling members 108. For example, it may be preferable to space a bottom of the electrical box approximately one, two, or three inches from a plane defined by the flat base 114 of the ceiling members 108. Alternatively, it may be preferable to configure the support bracket 110 so that the electrical box 106 is substantially flush with a plane defined by an outer side of a ceiling tile supported by the flat base 114 of the ceiling member 108, as shown in FIG. 9. In the illustrated example, the support bracket 110 uses threaded fasteners 198 to adjust the height of the electrical box 106, but other configurations for height adjustment are possible.

Figure 10:
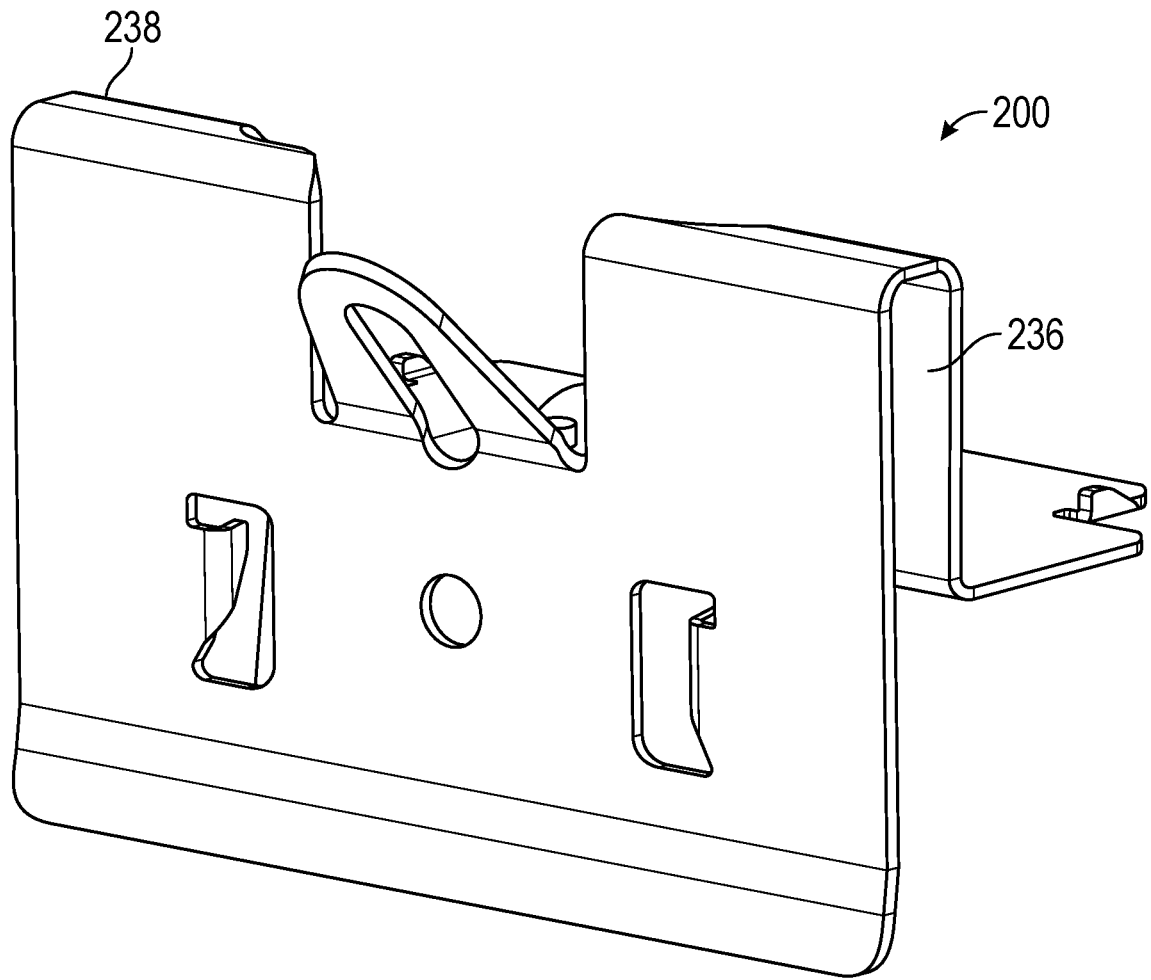
FIG. 10 is a rear isometric view of a mounting bracket according to another embodiment of the invention.
Figure 11:
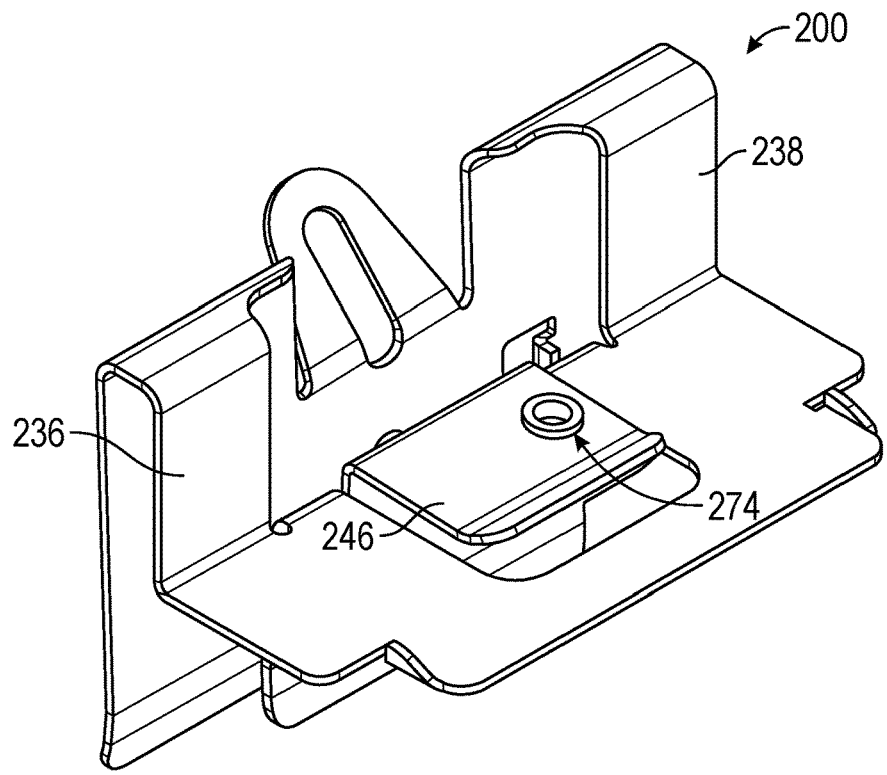
FIG. 11 is a front isometric view of the mounting bracket of FIG. 10.
Figure 12:
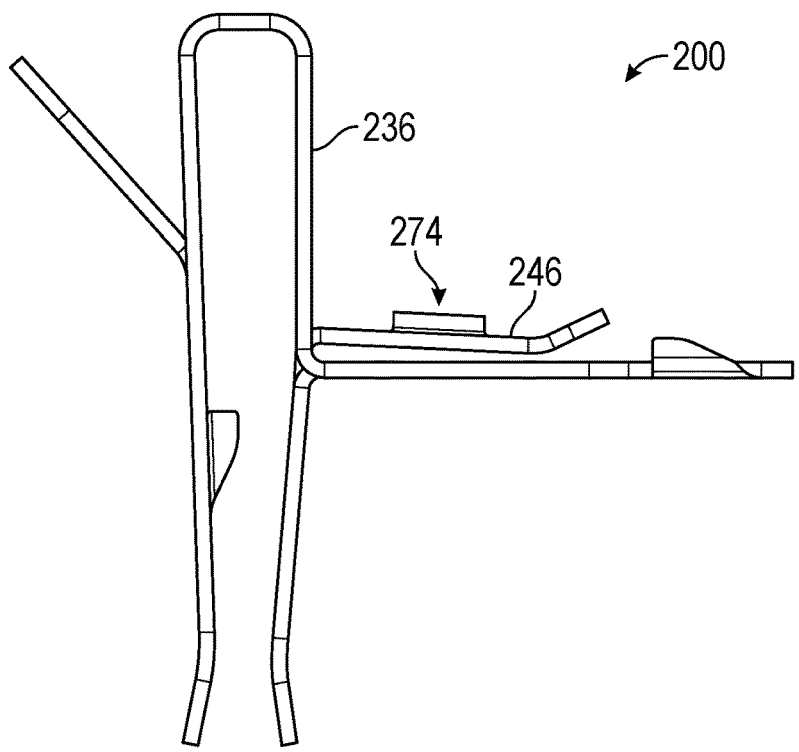
FIG. 12 is a side elevation view of the mounting bracket of FIG. 10.

FIGS. 10-12 illustrate a mounting bracket 200 according to another embodiment of the invention. The mounting bracket 200 is generally similar in design and functionality to the mounting bracket 100 shown in FIGS. 3-5, with similar elements identified using like reference numerals. However, the mounting bracket 200 may differ in some aspects. For example, the mounting bracket 200 has first and second arms 236, 238 that lack support ribs (or grooves). That is, the first and second arms 236, 238 define generally smooth surfaces. In the mounting bracket 100 of FIGS. 3-5, the support ribs 180 are included to strengthen the first and second arms 136, 138. However, in some embodiments, including for the mounting bracket 200 of FIG. 11, mounting brackets can be additionally or alternatively heat treated to enhance its strength. For example, the mounting bracket 200 may be through-hardened to appropriately enhance the strength of the arms 236, 238.

Additionally, referring particularly to FIG. 11, the mounting bracket 200 includes a second contact member 246 with a hole 274 that has a larger inner diameter than the hole 174 shown in FIG. 4. In some embodiments, the hole 274 may have an inner diameter of approximately 0.15 inches. Alternatively, the inner diameter of the hole 274 may be approximately 0.14 inches, or between about 0.12 and about 0.16 inches. However, mounting brackets according to alternative embodiments may include one or more holes having a variety of diameters and configured to receive fasteners or other elements.

Thus, embodiments of the invention can provide improved mounting systems for securing electrical boxes or other components, including relative to T-grid ceiling structures. In some embodiments, for example, an improved mounting system according to the invention may be easily assembled and require few fasteners or added hardware. Thus, for example, it may be relatively easy to install and use mounting systems according to embodiments of the present invention.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

What is claimed is:

1. A bracket system for securing an electrical box to a ceiling structure, the ceiling structure including a T-grid ceiling member with a base and a vertical stem that extends from the base, the bracket system comprising:

a support structure that includes a support section to support the electrical box, and an attachment end connected to the support section; and a mounting bracket that includes a unitary bracket body comprising:

a first support member;

a second support member connected to the first support member by a first arm and a second arm so that the first and second support members are resiliently movable relative to each other, wherein the first support member, the second support member, the first arm, and the second arm together define a support channel configured to slidably receive the vertical stem of the T-grid ceiling member, and wherein free ends of the first support member and the second support member, opposite the first and second arms, are configured to contact the base of the T-grid ceiling member when the vertical stem is received in the support channel; and a first contact member and a second contact member that are resiliently moveable relative to each other and extend from the second support member away from the support channel, between the free end of the second support member and the first and second arms, wherein the first contact member and the second contact member define a contact channel configured to slidably receive the attachment end of the support structure.

2. The bracket system of claim 1, wherein the attachment end of the support structure includes a planar portion that is configured to slidably insert into the contact channel.

3. The bracket system of claim 2, wherein the support structure further includes a shoulder at a junction between the attachment end and the support section; and
wherein the first contact member includes at least one contact tab that is configured to retain the attachment end of the support structure, when the attachment end is received in the contact channel, by engaging the shoulder of the support structure.

4. The bracket system of claim 1, wherein the first and second contact members extend from the second support member in a uniform direction to define the contact channel, and a plane of the second contact member is elevated relative to a plane of the first contact member in an installed orientation.

5. The bracket system of claim 1, wherein the second contact member is formed from material that is stamped out of the first contact member and corresponds to a stamped opening in the first contact member, the second contact member being aligned with the stamped opening.

6. The mounting bracket of claim 1, wherein the first contact member extends from the first and second arms; and
wherein second support member is formed of material that corresponds to a gap between the first and second arms, the second support member extending from the first contact member, between the first and second arms, in a direction opposite the first and second arms.

7. The mounting bracket of claim 6, wherein the second contact member extends from the second support member between the first and second arms.

8. The bracket system of claim 1, wherein a bent portion of the first arm and a bent portion of the second arm are aligned along a common plane to create a base to support the mounting bracket in an inverted position, the base corresponding to a closed end of the support channel.

9. The bracket system of claim 1, wherein the second support member includes a fastener attachment that is configured to threadably retain a fastener for securing the attachment end of the support structure to the mounting bracket.

10. The bracket system of claim 1, wherein the support structure further includes a shoulder at a junction between the attachment end and the support section; and
wherein the contact channel is configured to slidably receive the attachment end of the support structure so that the first contact member extends beyond the shoulder of the support structure and the second contact member ends before the shoulder of the support structure.

11. A mounting bracket for use with a support structure for securing an electrical box to a ceiling structure, the ceiling structure including a ceiling member with a base and a vertical stem, and the support structure including an attachment end and a support section to support the electrical box, the mounting bracket comprising a unitary bracket body that includes:
a first support member;
a second support member connected to the first support member to define a support channel for slidably receiving the vertical stem of the ceiling member, at least one of a free end of the first support member or a free end of the second support member, at an open end of the support channel, being configured to contact the base of the ceiling member when the vertical stem is received in the support channel; and
a first contact member and a second contact member that extend from the second support member, at a location spaced apart from the free end of the second support member, to define a contact channel for slidably receiving the attachment end of the support structure, with the first contact member opposite the second contact member from the free end of the second support member so that the first contact member is above the second contact member when the vertical stem is received in the support channel.

12. The mounting bracket of claim 11, wherein the free ends of the first and second support members are configured to contact the base of the ceiling member when the vertical stem is received in the support channel.

13. The mounting bracket of claim 11, wherein the first support member and the second support member are connected by at least one resilient arm so that the first and second support members are resiliently movable relative to each other to slidably receive the vertical stem of the ceiling member into the support channel.

14. The mounting bracket of claim 13, wherein the first and second contact members extend from the second support member away from the support channel, between the free end of the second support member and the at least one resilient arm.

15. The mounting bracket of claim 14, wherein the second support member is formed of material that corresponds to a stamped opening adjacent to the at least one resilient arm, the second support member extending away from the at least one resilient arm so that the second support member and the stamped opening are disposed on opposing sides of the first and second contact members.

16. The mounting bracket of claim 11, wherein the free ends of the first and second support members are equally spaced from a base of the support channel.

17. The mounting bracket of claim 11, wherein at least one of the first and second support members includes a fastener attachment that includes an extrusion to threadably receive a fastener to secure the attachment end of the support structure to the mounting bracket.

18. A method for securing an electrical box to a ceiling structure that includes a first ceiling member and a second ceiling member, each with a base and a vertical stem, the method comprising:
staging a support structure for installation by:
attaching the support structure to a first mounting bracket and a second mounting bracket by:
inserting a first attachment end of the support structure into a first contact channel of the first mounting bracket that is defined by first and second contact members of the first mounting bracket; and
inserting a second attachment end of the support structure into a second contact channel of the second mounting bracket that is defined by first and second contact members of the second mounting bracket; and
supporting a first end of each of the first and second mounting brackets on a work surface, with the first and second mounting brackets in a first orientation; and
attaching the first and second mounting brackets to the first and second ceiling members, with the first and second mounting brackets in a second orientation that is inverted relative to the first orientation, by sliding the first and second mounting brackets onto the first and second ceiling members, respectively, so that:

the vertical stem of the first ceiling member is received at a second end of the first mounting bracket in a support channel defined between first and second support members of the first mounting bracket; and the vertical stem of the second ceiling member is received at a second end of the second mounting bracket in a support channel defined between first and second support members of the second mounting bracket.

19. The method of claim 18, wherein for at least one of the first or second mounting brackets the second support member is connected to the first support member by a first arm and a second arm to define the support channel for slidably receiving a vertical stem of the first or second ceiling member, and wherein staging the support structure includes balancing the at least one of the first or second mounting brackets on the first and second arms on the work surface, in the first orientation.

20. The method of claim 18, wherein staging the support structure for installation further comprises:

with the first and second mounting brackets supported on the work surface in the first orientation, securing the first attachment end to the first mounting bracket with a first threaded fastener and securing the second attachment end to the second mounting bracket with a second threaded fastener.

\* \* \* \* \*